(12) United States Patent
Xu et al.

(10) Patent No.: US 10,195,996 B2
(45) Date of Patent: Feb. 5, 2019

(54) IMAGE DISPLAY METHOD AND SYSTEM OF VEHICLE REARVIEW MIRRORS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shuai Xu, Beijing (CN); Lei Guo, Beijing (CN); Zhiyong Wang, Beijing (CN); Qing Zhao, Beijing (CN); Hong Zhu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 150 days.

(21) Appl. No.: 15/223,513

(22) Filed: Jul. 29, 2016

(65) Prior Publication Data

US 2017/0190292 A1    Jul. 6, 2017

(30) Foreign Application Priority Data

Jan. 4, 2016 (CN) .......................... 2016 1 0006320

(51) Int. Cl.
*B60R 1/12* (2006.01)
*G06F 3/14* (2006.01)
(Continued)

(52) U.S. Cl.
CPC .................. *B60R 1/12* (2013.01); *B60R 1/00* (2013.01); *G06F 3/1446* (2013.01); *B60R 2001/1253* (2013.01); *B60R 2300/207* (2013.01); *B60R 2300/303* (2013.01); *B60R 2300/306* (2013.01); *B60R 2300/70* (2013.01); *G09G 5/14* (2013.01); *G09G 2340/14* (2013.01); *G09G 2370/20* (2013.01); *G09G 2380/10* (2013.01)

(58) Field of Classification Search
CPC ...... B60R 2300/207; B60R 2001/1253; B60R 1/00; G06F 3/1446
See application file for complete search history.

(56) References Cited

U.S. PATENT DOCUMENTS

| 2003/0052969 | A1* | 3/2003 | Satoh | B60R 1/00 |
| | | | | 348/148 |
| 2010/0201816 | A1* | 8/2010 | Lee | B60R 1/12 |
| | | | | 348/148 |
| 2014/0114534 | A1* | 4/2014 | Zhang | B60R 1/00 |
| | | | | 701/42 |

FOREIGN PATENT DOCUMENTS

| CN | 102804763 A | 11/2012 |
| CN | 202986966 U | 6/2013 |

(Continued)

OTHER PUBLICATIONS

China First Office Action, Application No. 201610006320.7, dated Jun. 22, 2017, 14 pgs.: with English translation.

(Continued)

*Primary Examiner* — Abbas I Abdulselam
(74) *Attorney, Agent, or Firm* — Armstrong Teasdale LLP (57) ABSTRACT

An image display method for vehicle rearview mirrors is provided. The method includes obtaining at last two images to be displayed by an image obtaining module, and displaying the at least two images in a split-screen manner on at least one rearview mirror of the vehicle rearview mirrors.

18 Claims, 4 Drawing Sheets

(51) Int. Cl.
*B60R 1/00* (2006.01)
*G09G 5/14* (2006.01)

(56) References Cited

FOREIGN PATENT DOCUMENTS

| | | |
|---|---|---|
| CN | 103496339 A | 1/2014 |
| CN | 105083134 A | 11/2015 |
| JP | 2004320567 A | 11/2004 |
| WO | 2015104860 A1 | 7/2015 |

OTHER PUBLICATIONS

China Second Office Action, Application No. 201610006320.7, dated Mar. 1, 2018, 18 pps.: with English translation.

\* cited by examiner

IMAGE DISPLAY METHOD AND SYSTEM OF VEHICLE REARVIEW MIRRORS

CROSS REFERENCE TO RELATED APPLICATIONS

This application claims the benefit of Chinese Patent Application No. 2016/10006320.7 filed Jan. 4, 2016, which is hereby incorporated by reference in its entirety.

BACKGROUND

Embodiments of the present invention relate to the display technical field, more particularly, to an image display method and system of vehicle rearview mirrors.

Vehicle rearview mirrors are reflective mirrors located at the left and right sides of the front of a vehicle, and a reflective mirror located at the upper part of the inner side the windshield glass of the vehicle, wherein the rearview mirrors at the left and right sides of the front of the vehicle are external rearview mirrors, and the rearview mirror at the inner side the windshield glass of the vehicle is an inner rearview mirror. The vehicle rearview mirrors can reflect road conditions behind and beside the vehicle, and enlarge the driver's field of vision.

In related art, rearview mirrors mainly have two types of mirror face: one is a flat mirror face, through which images with the same size as what one sees can be obtained. Such a flat mirror is usually used as an inner rearview mirror. The other type is a convex mirror, the mirror face of which is curved, with a different radius of curvature; through the convex mirror, images smaller than what one sees can be obtained. The convex mirror enlarges the driver's field of vision, and such a convex mirror is usually used as an external rearview mirror.

However, the rearview mirrors in the related art can merely reflect road conditions around the vehicle, the images displayed are monotonous, and the flexibility of image displaying is low.

BRIEF DESCRIPTION

Example embodiments of the disclosure provide an image display method and system of vehicle rearview mirrors.

In one aspect, an image display method of vehicle rearview mirrors is provided. The method includes obtaining at least two images to be displayed by an image obtaining module, and displaying the at least two images to be displayed in a split-screen manner on at least one rearview mirror of the vehicle rearview mirrors.

Optionally, the image obtaining module includes an external image capturing camera and an internal image obtaining sub-module, the obtaining at least two images to be displayed by an image obtaining module including capturing vehicle environment images by the external image capturing camera, and obtaining multimedia images by the internal image obtaining sub-module, the at least two images to be displayed including the vehicle environment images and the multimedia images.

Optionally, the external image capturing camera includes a front camera disposed at the front of the vehicle and a rear camera disposed at the back of the vehicle, the capturing vehicle environment images by the external image capturing camera including capturing environment images in front of the vehicle by the front camera, and capturing environment images behind the vehicle by the rear camera, the vehicle environment images including the environment images in front of the vehicle and the environment images behind the vehicle.

Optionally, the multimedia images include at least one of navigation images, audio/video images and drive recording images.

Optionally, the method further includes receiving a touch signal by a touch module, determining a target image from the at least two images to be displayed according to the touch signal, and displaying the target image in full screen by the at least one rearview mirror of the vehicle rearview mirrors.

Optionally, the vehicle rearview mirrors include an inner rearview mirror, and the displaying the at least two images to be displayed in a split-screen manner on at least one rearview mirror of the vehicle rearview mirrors includes displaying the at least two images to be displayed on the inner rearview mirror in a split-screen manner.

In another aspect, there is provided an image display system of vehicle rearview mirrors, wherein the system includes an image obtaining module and vehicle rearview mirrors, and the vehicle rearview mirrors include at least one rearview mirror, the image obtaining module is configured to obtain at least two images to be displayed, and the vehicle rearview mirrors are configured to display the at least two images to be displayed in a split-screen manner on the at least one rearview mirror.

Optionally, the image obtaining module includes an external image capturing camera and an internal image obtaining sub-module, the external image capturing camera is configured to capture vehicle environment images, the internal image obtaining sub-module is configured to obtain multimedia images, the at least two images to be displayed including the vehicle environment images and the multimedia images.

Optionally, the external image capturing camera includes a front camera disposed at the front of vehicle and a rear camera disposed at the back of vehicle, the front camera is configured to capture environment images in front of the vehicle, the rear camera is configured to capture environment images behind the vehicle, the vehicle environment images including the environment images in front of the vehicle and the environment images behind the vehicle.

Optionally, the multimedia images include at least one of navigation images, audio/video images and drive recording images.

Optionally, the system further includes a touch module and a processing module, the touch module is configured to receive a touch signal, and transmit the touch signal to the processing module, the processing module is configured to determine a target image from the at least two images to be displayed, the vehicle rearview mirrors are further configured to display the target image through the at least one rearview mirror.

Optionally, the vehicle rearview mirrors include an inner rearview mirror, the vehicle rearview mirrors further configured to display the at least two images to be displayed in a split-screen manner on the inner rearview mirror.

Embodiments of the disclosure provide an image display method and system of vehicle rearview mirrors. The image display system of vehicle rearview mirrors includes an image obtaining module and vehicle rearview mirrors, the vehicle rearview mirrors including at least one rearview mirror. The image display system may obtain at least two images to be displayed by the image obtaining module, and display the at least two images to be displayed in a split-screen manner on at least one rearview mirror of the vehicle rearview mirrors, thus enriching the content of the images displayed in the vehicle rearview mirrors, and enhancing the flexibility of image displaying.

BRIEF DESCRIPTION OF THE DRAWINGS

In order to describe the embodiments of the disclosure more clearly, the following will briefly describe the accompanying drawings used in the description of example embodiments. Obviously, the accompanying drawings in the following description are merely some embodiments, and to those of ordinary skill in the art, other embodiments may also be obtained according to these accompanying drawings without any inventive effort.

DETAILED DESCRIPTION

In order to make the advantages of the disclosure clearer, the following will describe the technical solutions of example embodiments clearly and completely in conjunction with the accompanying drawings.

Figure 1:
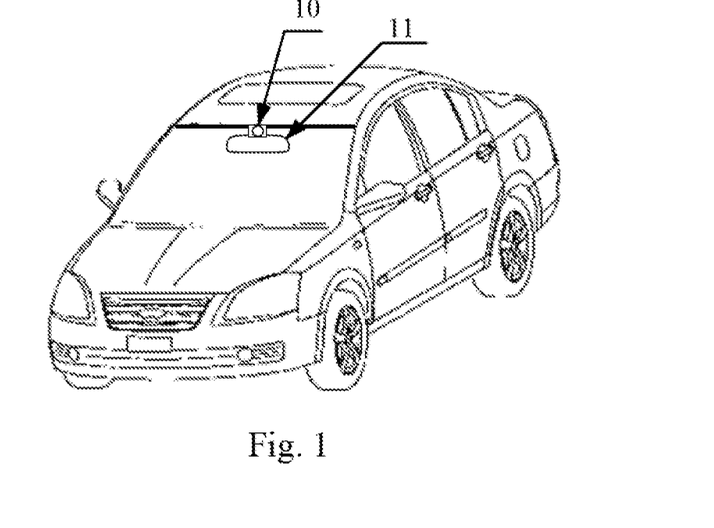
FIG. 1 is a schematic view of an image display system of vehicle rearview mirrors provided by an embodiment.

FIG. 1 is a schematic view of an image display system of vehicle rearview mirrors provided by an embodiment. As shown in FIG. 1, the system may include an image obtaining module 10 and vehicle rearview mirrors. The vehicle rearview mirrors 11 include at least one rearview mirror, e.g., an inner rearview mirror disposed at the inner side the vehicle windshield glass. The image obtaining module 10 and the vehicle rearview mirrors 11 may be connected through a wired network or wireless network, and the vehicle rearview mirrors 11 are for displaying in a split-screen manner the at least two images to be displayed obtained by the image obtaining module 10.

Figure 2:
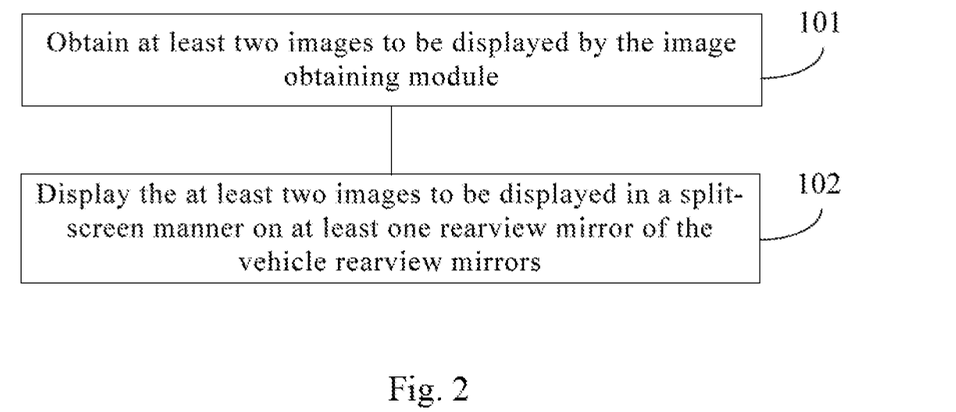
FIG. 2 is a flowchart of an image display method of vehicle rearview mirrors provided by an embodiment.

FIG. 2 is a flowchart of an image display method of vehicle rearview mirrors provided by an embodiment. The method may be applied in the image display system of vehicle rearview mirrors shown in FIG. 1. As shown in FIG. 2, the method includes Step 101: obtain at least two images to be displayed by the image obtaining module, and Step 102: display the at least two images to be displayed in a split-screen manner on at least one rearview mirror of the vehicle rearview mirrors.

To sum up, embodiments described herein provide an image display method of vehicle rearview mirrors. The image display system of vehicle rearview mirrors may obtain at least two images to be displayed by an image obtaining module, and display the at least two images to be displayed in a split-screen manner on at least one rearview mirror of the vehicle rearview mirrors, thus enriching the content of the images displayed in the vehicle rearview mirrors, and enhancing the flexibility of image displaying.

Optionally, the image obtaining module includes an external image capturing camera and an internal image obtaining sub-module, and the obtaining at least two images to be displayed by the image obtaining module includes capturing vehicle environment images by the external image capturing camera, and obtaining multimedia images by the internal image obtaining sub-module, the at least two images to be displayed including the vehicle environment images and the multimedia images.

Optionally, the external image capturing camera includes a front camera disposed at the front of the vehicle and a rear camera disposed at the back of the vehicle, and the capturing vehicle environment images by the external image capturing camera includes capturing environment images in front of the vehicle by the front camera, and capturing environment images behind the vehicle by the rear camera, the vehicle environment images including the environment images in front of the vehicle and the environment images behind the vehicles.

Optionally, the multimedia images include at least one of navigation images, audio/video images and drive recording images.

Optionally, the image display system of vehicle rearview mirrors further includes a touch module, the method further including receiving a touch signal by the touch module, determining a target image from the at least two images to be displayed according to the touch signal, and displaying the target image in full screen by the at least one rearview mirror of the vehicle rearview mirrors.

Optionally, the vehicle rearview mirrors include an inner rearview mirror, and the displaying the at least two images to be displayed in a split-screen manner on at least one rearview mirror of the vehicle rearview mirrors includes displaying the at least two images to be displayed on the inner rearview mirror in a split-screen manner.

To sum up, embodiments of the disclosure provide an image display method of vehicle rearview mirrors. The image display system of vehicle rearview mirrors may obtain at least two images to be displayed by the image obtaining module, and display the at least two images to be displayed in a split-screen manner on at least one rearview mirror of the vehicle rearview mirrors, thus enriching the content of images displayed in the vehicle rearview mirrors, and enhancing the flexibility of image displaying.

Figure 3:
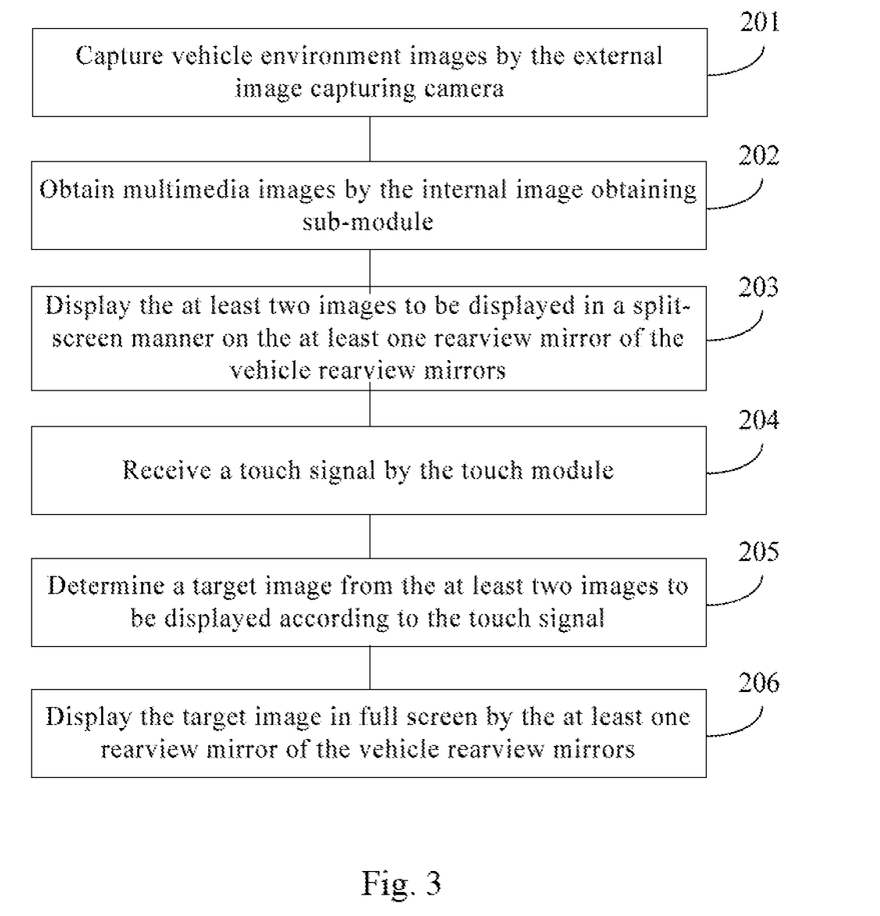
FIG. 3 is a flowchart of another image display method of vehicle rearview mirrors provided an embodiment.

FIG. 3 is a flowchart of another image display method of vehicle rearview mirrors provided by an embodiment. The method can be applied in the image display system of vehicle rearview mirrors shown in FIG. 1. As shown in FIG. 3, the method includes Step 201: capture vehicle environment images by the external image capturing camera.

In an embodiment of the present application, the image obtaining module of the image display system of vehicle rearview mirrors may include an external image capturing camera and an internal image obtaining sub-module, wherein the external image capturing camera may capture vehicle environment images, i.e., road condition images around the vehicle. Further, the external image capturing camera may include a front camera disposed in front of the vehicle and a rear camera disposed at the back of the vehicle. The front camera may capture environment images in front of the vehicle, and the back camera may capture environment image behind the vehicle. Thus, the vehicle environment images captured by the external image capturing camera may include environment images in front of the vehicle and environment image behind the vehicle.

The method further includes Step 202, obtain multimedia images by the internal image obtaining sub-module.

In an embodiment of the present application, the image obtaining module may further include an internal image obtaining sub-module, which may obtain multimedia images, the multimedia images including at least one of navigation images, audio/video images and drive recording images.

The method further includes Step 203, display the at least two images to be displayed in a split-screen manner on the at least one rearview mirror of the vehicle rearview mirrors.

Figure 4:
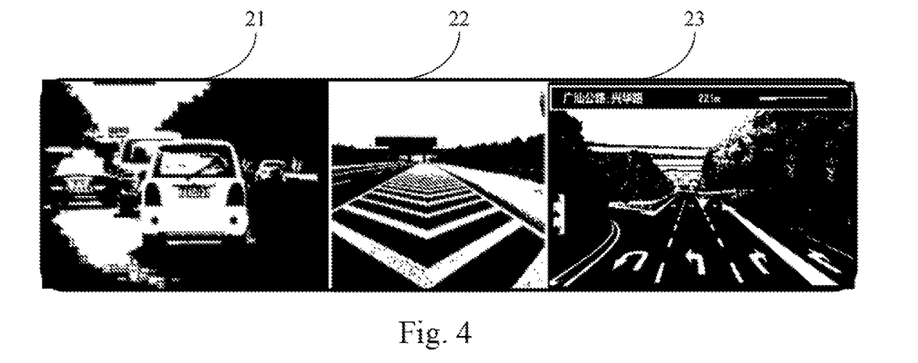
FIG. 4 is a schematic view of displaying images in a split-screen manner by the vehicle rearview mirrors provided by an embodiment.

Displaying in a split-screen manner refers to displaying the images to be displayed obtained by at least two image obtaining sub-modules on one screen simultaneously. In an embodiment, the at least two image obtaining sub-modules may be an external image capturing camera and an internal image obtaining sub-module. The at least two images to be displayed include vehicle environment images and multimedia images, wherein the vehicle environment images may include environment images in front of the vehicle and environment images behind the vehicle. In an embodiment, the vehicle rearview mirrors in the image display system of vehicle rearview mirrors may include one inner rearview mirror and two external rearview mirrors. The image display system of vehicle rearview mirrors may display the at least two images to be displayed in a split-screen manner by the inner rearview mirror. For example, supposing the images obtained by the image obtaining module of the image display system of vehicle rearview mirrors comprise environment images in front of the vehicle, environment images behind the vehicle, and navigation images, the images displayed in a split-screen manner by the inner rearview mirror of the vehicle are as shown in FIG. 4. It can be seen from FIG. 4 that, the inner rearview mirror of the vehicle displays environment images 21 in front of the vehicle, environment images 22 behind the vehicle, and navigation images 23, thus enriching the content of the images displayed in the vehicle rearview mirrors, and facilitating the driver understanding comprehensively the road condition information around the vehicle.

Figure 5:
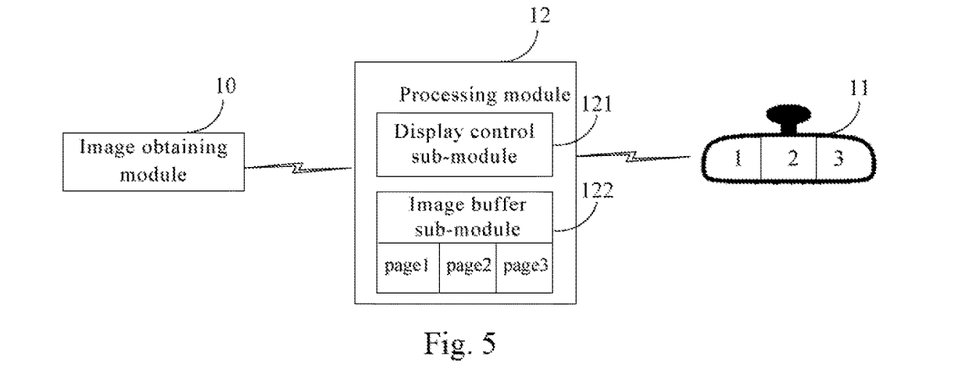
FIG. 5 is a schematic view of another image display system of vehicle rearview mirrors provided by an embodiment.

It should be noted that in embodiments of the disclosure, the image display system of vehicle rearview mirrors may further include a processing module. As shown in FIG. 5, the processing module 12 may be connected with the image obtaining module 10 and the vehicle rearview mirrors 11 respectively through a wired network or a wireless network. The processing module 12 may include a display control sub-module 121 and an image buffer sub-module 122. The image buffer sub-module 122 may include at least two buffer regions, and the at least two buffer regions are for buffering respectively at least two images to be displayed as obtained by the image obtaining module 10. For example, supposing the image buffer sub-module 122 includes three image buffer regions: page1, page2, and page 3, wherein the image buffer region page1 may store an environment image in front of the vehicle obtained by the vehicle front camera, the image buffer region page2 may store an environment image behind the vehicle obtained by the vehicle rear camera, and the image buffering region page3 may store a navigation image obtained by the internal image obtaining sub-module. The display control sub-module 121 may display the images buffered in the three image buffer regions synchronously in the corresponding display regions in the vehicle rearview mirror 11. For example, the image buffered in the image buffer region page1 may be displayed in the display region 1 of the vehicle rearview mirror 11, and the image buffered in the image buffer region page2 and image buffer region page3 may be displayed in the display regions 2 and 3 respectively, so as to realize the effect of displaying in split-screen. When the image stored in any one of the image buffer regions is updated, the display control sub-module 121 may display the updated image in the corresponding region of the vehicle rearview mirror 11, without affecting the images displayed in other regions.

The method further includes Step 204, receive a touch signal by the touch module.

In an embodiment, the image display system of vehicle rearview mirrors may further include a touch module. The touch module may be disposed inside the display screen of a vehicle rearview mirror. The touch module may generate a corresponding touch signal according to the user's touch operation received, and the image display system of vehicle rearview mirrors may adjust the image display effect of the vehicle rearview mirror according to the touch signal, e.g., displaying a specified image in full screen, or displaying several specified images in a split-screen manner, etc. Therein, the user's touch operation may be a touch operation, a voice operation or a key-pressing operation, and embodiments described herein have no limitation in this respect.

The method further includes Step 205, determine a target image from the at least two images to be displayed according to the touch signal.

The touch signal received by the touch module of the image display system of vehicle rearview mirrors may include an identifier of the target image. The system may determine the target image from the at least two images to be displayed which are displayed in the vehicle rearview mirror according to the identifier of the target image. For example, supposing the user double-clicks the display region displaying a navigation image 23 in the display screen of the inner rearview mirror shown in FIG. 4, the touch module may generate a corresponding touch signal according to the received touch screen operation. The touch signal may include an identifier of navigation image 23, such that the image display system of vehicle rearview mirrors may determine the navigation image as the target image according to the identifier.

The method further includes Step 206, display the target image in full screen by the at least one rearview mirror of the vehicle rearview mirrors.

Figure 6:
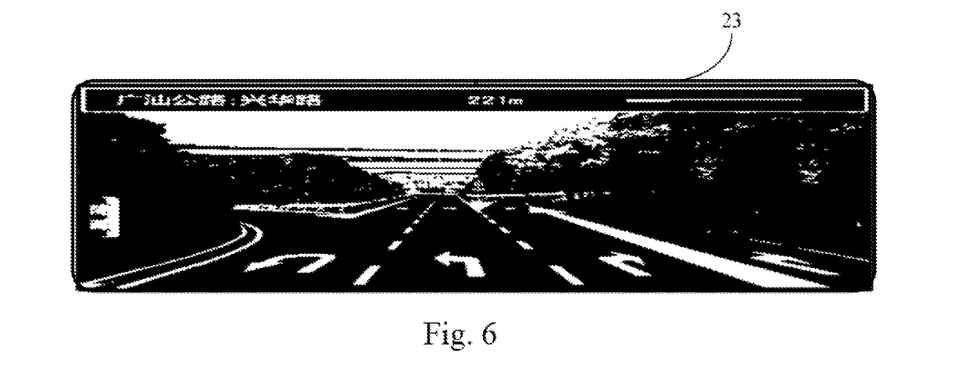
FIG. 6 is a schematic view of displaying a target image in full screen by a vehicle inner rearview mirror according to an embodiment.

The image display system of vehicle rearview mirrors may display the target image in full screen by the inner rearview mirror of the vehicle. For example, FIG. 6 is a schematic view of displaying a target image in full screen by the inner rearview mirror of the vehicle. As shown in FIG. 6, the inner rearview mirror of the vehicle displays a navigation image 23 in full screen.

It should be noted that when the image display system of vehicle rearview mirrors receives a touch signal in the full-screen display state, it may further display the at least two images to be displayed in a split-screen manner by the at least one rearview mirror of the vehicle rearview mirrors according to the touch signal. Therefore, the image display method of the rearview mirrors not only enriches the content of the images displayed by the vehicle rearview mirrors, but also enhances the flexibility of image displaying by the vehicle rearview mirrors.

To sum up, embodiments described herein provide an image display method of vehicle rearview mirrors. The image display system of vehicle rearview mirrors may obtain at least two images to be displayed by the image obtaining module, and display the at least two images to be displayed in a split-screen manner on at least one rearview mirror of the vehicle rearview mirrors, thus enriching the content of the images displayed in the vehicle rearview mirrors, and enhancing the flexibility of image displaying.

It should be noted that the steps of the image display method of vehicle rearview mirrors may be adjusted appropriately, and the steps may also be added or reduced according to actual conditions. Those method variations that those skilled in the art may easily think of within the technical scope disclosed are covered by the protection scope of the disclosure, and are not described here.

Figure 7:
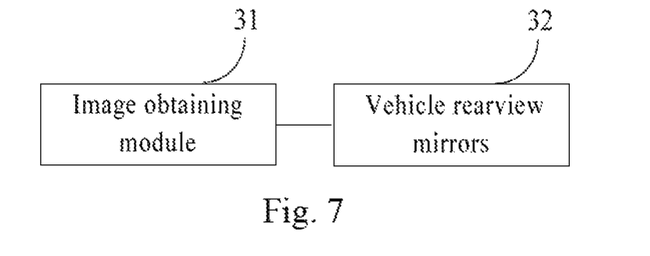
FIG. 7 is a structural schematic view of an image display system of vehicle rearview mirrors provided by an embodiment.

FIG. 7 is a schematic view of an image display system of vehicle rearview mirrors provided by an embodiment. As shown in FIG. 7, the system including an image obtaining module 31 and vehicle rearview mirrors 32, the vehicle rearview mirrors including at least one rearview mirror.

The image obtaining module 31 is configured to obtain at least two images to be displayed.

The vehicle rearview mirror 32 is configured to display the at least two images to be displayed in a split-screen manner on the at least one rearview mirror.

To sum up, embodiments described herein provide an image display system of vehicle rearview mirrors, and the system may obtain at least two images to be displayed by the image obtaining module, and display the at least two images to be displayed in a split-screen manner on the at least one rearview mirror of the vehicle rearview mirrors. Therefore, it enriches the content of the images displayed in the vehicle rearview mirrors, and enhances the flexibility of image displaying.

Figure 8:
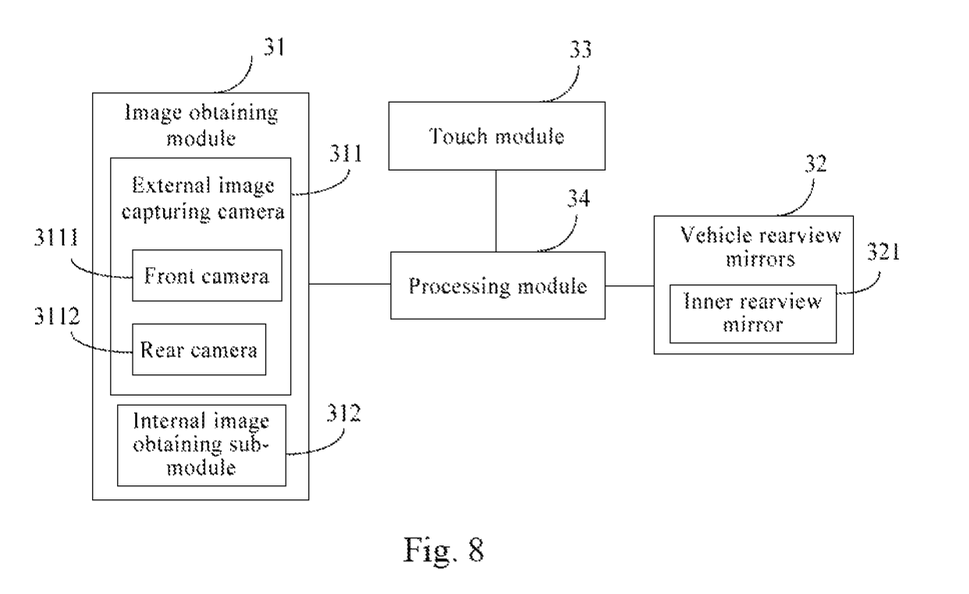
FIG. 8 is a structural schematic view of another image display system of vehicle rearview mirrors provided by an embodiment.

FIG. 8 is a schematic view of another image display system of vehicle rearview mirrors provided by an embodiment. As shown in FIG. 8, the system includes an image obtaining module 31, a vehicle rearview mirror 32, a touch module 33, and a processing module 34. The vehicle rearview mirror includes at least one rearview mirror.

The image obtaining module 31 is configured to obtain at least two images to be displayed.

The vehicle rearview mirrors 32 are configured to display the at least two images to be displayed in a split-screen manner on the at least one rearview mirror.

The touch module 33 is configured to receive a touch signal and send the touch signal to the processing module.

The processing module 34 is configured to determine a target image from the at least two images to be displayed according to the touch signal.

Optionally, as shown in FIG. 7, the image obtaining module 31 includes an external image capturing camera 311 and an internal image obtaining sub-module 312.

The external image capturing camera 311 is configured to capture vehicle environment images.

The internal image obtaining sub-module 312 is configured to obtain multimedia images, and the at least two images to be displayed include the vehicle environment images and the multimedia images.

Optionally, as shown in FIG. 7, the external image capturing camera 311 includes a front camera 3111 disposed at the front of the vehicle, and a rear camera 3112 disposed at the back of the vehicle.

The front camera 311 is configured to capture environment images in front of the vehicle.

The rear camera 3112 is configured to capture environment images behind the vehicle, and the vehicle environment images include environment images in front of the vehicle and the environment images behind the vehicle.

Optionally, the multimedia images include at least one of navigation images, audio/video images and drive recording images.

The vehicle rearview mirrors 32 are further configured to display the target image in full screen on the at least one rearview mirror.

Optionally, the vehicle rearview mirrors 32 include an inner rearview mirror 321. The vehicle rearview mirror 32 is further configured to display the at least two images to be displayed in a split-screen manner by the inner rearview mirror 321.

To sum up, embodiments described herein provide an image display system of vehicle rearview mirrors. The system may obtain at least two images to be displayed by the image obtaining module, and display the at least two images to be displayed in a split-screen manner on the at least one rearview mirror of the vehicle rearview mirrors, thus enriching the content of the images displayed in the vehicle rearview mirrors, and enhancing the flexibility of image displaying.

Those skilled in the art clearly understand that, for simplicity and brevity of description, the detailed working processes of the above-described system and modules are omitted here, and reference may be made to the above-described corresponding processes in the embodiments of the method.

Described above are merely example embodiments, and are not limiting. Any amendments, equivalent substitutions or improvements made within the spirits and principles of the disclosure are within the protection scope of the present invention.

What is claimed is:

1. An image display method for vehicle rearview mirrors, the method comprising:

obtaining at least two images to be displayed by an image obtaining module;

displaying the at least two images in a split-screen manner on at least one rearview mirror of the vehicle rearview mirrors;

receiving a touch signal using a touch module;

determining a target image from the at least two images based on the touch signal;

displaying the target image in full screen on the at least one rearview mirror;

displaying, according to the received touch signal, a plurality of designated images through at least one rearview mirror of the vehicle rearview mirror, in the split-screen manner, wherein the image display system comprises: a processing module respectively connected to the image obtaining module and the vehicle rearview mirror; the processing module comprises: a display control sub-module and an image buffer sub-module including at least two image buffer regions, which are used to buffer the at least two images to be displayed; and displaying, by the display control sub-module, the images buffered by the at least two image buffer regions, in corresponding display areas of the vehicle rearview mirror, simultaneously, wherein when an image stored in any of image buffer regions is updated, the updated image is displayed in the corresponding display area of the vehicle rearview mirror by the display control sub-module.

2. The method of claim 1, wherein the image obtaining module includes an external image capturing camera and an internal image obtaining sub-module, and wherein obtaining at least two images comprises:

capturing vehicle environment images using the external image capturing camera; and obtaining multimedia images using the internal image obtaining sub-module, the at least two images including the vehicle environment images and the multimedia images.

3. The method of claim 2, wherein the external image capturing camera includes a front camera disposed at a front of a vehicle and a rear camera disposed at a back of the vehicle, and wherein capturing vehicle environment images comprises:

capturing environment images in front of the vehicle using the front camera; and capturing environment images behind the vehicle using the rear camera, the vehicle environment images including the environment images in front of the vehicle and the environment images behind the vehicles.

4. The method of claim 3, wherein the vehicle rearview mirrors include an inner rearview mirror, and wherein displaying the at least two images comprises displaying the at least two images on the inner rearview mirror in a split-screen manner.

5. The method of claim 3, wherein the multimedia images include at least one of navigation images, audio/video images, and drive recording images.

6. The method of claim 5, wherein the vehicle rearview mirrors include an inner rearview mirror, and wherein displaying the at least two images comprises displaying the at least two images on the inner rearview mirror in a split-screen manner.

7. The method of claim 2, wherein the vehicle rearview mirrors include an inner rearview mirror, and wherein displaying the at least two images comprises displaying the at least two images on the inner rearview mirror in a split-screen manner.

8. The method of claim 1, wherein the vehicle rearview mirrors include an inner rearview mirror, and wherein displaying the at least two images comprises displaying the at least two images on the inner rearview mirror in a split-screen manner.

9. The method of claim 1, wherein the vehicle rearview mirrors include an inner rearview mirror, and wherein displaying the at least two images comprises displaying the at least two images on the inner rearview mirror in a split-screen manner.

10. An image display system for vehicle rearview mirrors, the system comprising an image obtaining module, vehicle rearview mirrors, a touch module and a processing module, and the vehicle rearview mirrors comprising at least one rearview mirror, wherein:

the image obtaining module is configured to obtain at least two images to be displayed;

the vehicle rearview mirrors are configured to display the at least two images in a split-screen manner on the at least one rearview mirror;

the touch module is configured to receive a touch signal, and transmit the touch signal to the processing module;

the processing module is configured to determine a target image from the at least two images to be displayed;

the vehicle rearview mirrors are further configured to display the target image using the at least one rearview mirror, in full screen;

the vehicle rearview mirrors are configured to display, according to a received touch signal, a plurality of designated images through at least one rearview mirror of the vehicle rearview mirror, in the split-screen manner;

the processing module is respectively connected to the image obtaining module and the vehicle rearview mirror; the processing module comprises: a display control sub-module and an image buffer sub-module including at least two image buffer regions, which are used to buffer the at least two images to be displayed;

the display control sub-module is configured to display the images buffered by the at least two image buffer regions, in corresponding display areas of the vehicle rearview mirror, simultaneously; and when an image stored in any of image buffer regions is updated, the updated image is displayed in the corresponding display area of the vehicle rearview mirror by the display control sub-module.

11. The system of claim 10, wherein the image obtaining module comprises an external image capturing camera and an internal image obtaining sub-module, wherein:

the external image capturing camera is configured to capture vehicle environment images; and the internal image obtaining sub-module is configured to obtain multimedia images, the at least two images to be displayed comprising the vehicle environment images and the multimedia images.

12. The system of claim 11, wherein the external image capturing camera comprises a front camera disposed at a front of a vehicle and a rear camera disposed at a back of the vehicle, wherein:

the front camera is configured to capture environment images in front of the vehicle; and the rear camera is configured to capture environment images behind the vehicle, the vehicle environment images comprising the environment images in front of the vehicle and the environment images behind the vehicle.

13. The system of claim 12, wherein the multimedia images include at least one of navigation images, audio/video images, and drive recording images.

14. The system of claim 13, wherein the vehicle rearview mirrors comprise an inner rearview mirror, and wherein the vehicle rearview mirrors are further configured to display the at least two images to be displayed in a split-screen manner on the inner rearview mirror.

15. The system of claim 12, wherein the vehicle rearview mirrors comprise an inner rearview mirror, and wherein the vehicle rearview mirrors are further configured to display the at least two images to be displayed in a split-screen manner on the inner rearview mirror.

16. The system of claim 11, wherein the vehicle rearview mirrors comprise an inner rearview mirror, and wherein the vehicle rearview mirrors are further configured to display the at least two images to be displayed in a split-screen manner on the inner rearview mirror.

17. The system of claim 10, wherein the vehicle rearview mirrors comprise an inner rearview mirror, and wherein the vehicle rearview mirrors are further configured to display the at least two images to be displayed in a split-screen manner on the inner rearview mirror.

18. The system of claim 10, wherein the vehicle rearview mirrors comprise an inner rearview mirror, and wherein the vehicle rearview mirrors are further configured to display the at least two images to be displayed in a split-screen manner on the inner rearview mirror.

* * * * *